United States Patent
Saad

(10) Patent No.: US 10,637,985 B1
(45) Date of Patent: Apr. 28, 2020

(54) SYSTEMS AND METHODS FOR LOCATING A MOBILE PHONE IN A VEHICLE

(71) Applicant: Toyota Research Institute, Inc., Los Altos, CA (US)

(72) Inventor: Mohammad Saad, San Mateo, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 16/423,328

(22) Filed: May 28, 2019

(51) Int. Cl.
| | |
|---|---|
| H04M 3/00 | (2006.01) |
| H04M 1/725 | (2006.01) |
| G01S 1/76 | (2006.01) |
| G06N 20/00 | (2019.01) |

(52) U.S. Cl.
CPC ........... *H04M 1/72577* (2013.01); *G01S 1/76* (2013.01); *G06N 20/00* (2019.01); *H04M 1/72569* (2013.01)

(58) Field of Classification Search
CPC .......... H04M 1/72577; H04M 1/72569; G06N 20/00; G01S 1/76
See application file for complete search history.

(56) References Cited

U.S. PATENT DOCUMENTS

| | | | |
|---|---|---|---|
| 9,537,989 B2 | 1/2017 | Atkinson et al. | |
| 9,888,392 B1 | 2/2018 | Snyder et al. | |
| 2013/0278415 A1 | 10/2013 | Morgan, Jr. | |
| 2013/0336094 A1* | 12/2013 | Gruteser | G01S 11/14 367/117 |
| 2013/0344856 A1* | 12/2013 | Silver | G06N 20/00 455/418 |
| 2014/0273859 A1* | 9/2014 | Luna | H04W 4/023 455/41.3 |
| 2015/0312404 A1* | 10/2015 | Abramson | H04W 4/027 455/418 |
| 2016/0198310 A1* | 7/2016 | Chalmers | H04W 4/40 455/456.1 |
| 2017/0019525 A1 | 1/2017 | Hannon et al. | |
| 2017/0344854 A1* | 11/2017 | Behringer | G06F 16/435 |
| 2018/0173494 A1* | 6/2018 | Choi | G06F 3/167 |
| 2019/0156150 A1* | 5/2019 | Krishnan | G06K 9/00597 |

FOREIGN PATENT DOCUMENTS

WO 2015106415 A1 7/2015

* cited by examiner

*Primary Examiner* — Charles T Shedrick
(74) *Attorney, Agent, or Firm* — Christopher G. Darrow; Darrow Mustafa PC

(57) ABSTRACT

In one embodiment, a system for locating a mobile phone in a vehicle is provided. The system includes one or more processors and a memory communicably coupled to the one or more processors and storing a detection module and a safety module. The detection module including instructions that when executed by the one or more processors cause the one or more processors to: determine that a mobile phone is located in a vehicle. The safety module including instructions that when executed by the one or more processors cause the one or more processors to: in response to the determination, play a sound in the vehicle; record the sound played in the vehicle; based on the recorded sound and a sound model, determine if the mobile phone is in a driver seat of the vehicle; and if it is determined that the mobile phone is in the driver seat of the vehicle, disable at least some functionality of the mobile phone.

18 Claims, 4 Drawing Sheets

SYSTEMS AND METHODS FOR LOCATING A MOBILE PHONE IN A VEHICLE

TECHNICAL FIELD

The subject matter described herein relates, in general, to systems and methods for locating and disabling mobile phones in vehicles, and, in particular, to using sound to determine if a mobile phone is located in a driver seat, and if so, disabling some functionality of the mobile phone while the mobile phone remains in the driver seat.

BACKGROUND

Distracted driving is dangerous problem that leads to many accidents every year. A major source of distraction for drivers is mobile phones, particularly among younger drivers. For example, a driver may periodically glance at their phone while driving to check on a received text message or a notification, which forces the driver to take their focus away from the road and increases the likelihood of an accident.

While everyone agrees that mobile phone use while driving is a problem, there are currently no good solutions to prevent such usage. One solution is to disable mobile phones in a vehicle while the vehicle is moving. While this solution prevents the driver from using a mobile phone, it also prevents non-driving passengers from using their mobile phones. Therefore, what is needed is a means to prevent mobile phone usage by a driver of a vehicle, while still allowing mobile phone usage be passengers in the vehicle.

SUMMARY

In one embodiment, a system for locating mobile phones in vehicles is provided. The system generates a sound model for each type of vehicle. A type may include a particular vehicle make and model. For each vehicle type, a sound model is created by generating training data for the vehicle type using a mobile phone that is configured to play a sound such as a sine sweep from different seat locations in the vehicle. At each vehicle seat location, the played sound is recorded by the mobile phone and associated with the seat location. Because of different room modes associated with each vehicle seat location, there will be differences between the recordings made at each seat location even though the played sounds were identical. These recordings and seat locations are used to train the sound model to identify the seat location of a mobile phone in the vehicle of the type given a recording of sound played by the mobile phone.

After generating the sound models for each vehicle, when a mobile phone is detected in a vehicle, the mobile phone is caused to play the sound while also recording. The sound model corresponding to the type of vehicle uses the recording to determine which seat the mobile phone is likely located in. If the determined seat is the driver seat, the system may disable some functionality of the mobile phone such as text messaging, notifications, voice calling, etc. If the determined seat is not the driver seat, the system allows the mobile phone to function normally. Thus the system described herein solves the problems associated with the prior art by allowing mobile phones to be used in the vehicle for all of the passengers, while disallowing mobile phones to be used by the driver.

In one embodiment, a system for locating a mobile phone is a vehicle is provided. The system includes one or more processors and a memory communicably coupled to the one or more processors and storing a detection module and a safety module. The detection module including instructions that when executed by the one or more processors cause the one or more processors to: determine that a mobile phone is located in a vehicle. The safety module including instructions that when executed by the one or more processors cause the one or more processors to: in response to the determination, play a sound in the vehicle; record the sound played in the vehicle; based on the recorded sound and a sound model, determine if the mobile phone is in a driver seat of the vehicle; and if it is determined that the mobile phone is in the driver seat of the vehicle, disable at least some functionality of the mobile phone.

Implementations may include some or all of the following features. The safety module may further include instructions that when executed by the one or more processors cause the one or more processors to: determine that the vehicle has stopped moving; and in response to the determination, enable the at least some functionality of the mobile phone. The safety module may further include instructions that when executed by the one or more processors cause the one or more processors to: determine that the mobile phone has moved within the vehicle; and in response to determining that the mobile phone has moved within the vehicle: play the sound in the vehicle; record the sound played in the vehicle; based on the recorded sound and the sound model, determine if the mobile phone is in the driver seat of the vehicle; and if it is determined that the mobile phone is in the driver seat of the vehicle, disable the at least some functionality of the mobile phone. The safety module may further include instructions that when executed by the one or more processors cause the one or more processors to: determine a vehicle type of the vehicle; and select the sound model from a plurality of sound models based on the determined vehicle type. Each sound model of the plurality of sound models may be trained using a different vehicle type of a plurality of vehicle types. The sound may be played from a vehicle speaker. The sound may be played from a speaker of the mobile phone. The sound may be a sine sweep.

In one embodiment, a method for locating a mobile phone in a vehicle is provided. The method includes: determining that a mobile phone is located in a vehicle; in response to the determination, playing a sound in the vehicle; recording the sound played in the vehicle; based on the recorded sound and a sound model, determining if the mobile phone is in a driver seat of the vehicle; and if it is determined that the mobile phone is in the driver seat of the vehicle, disabling at least some functionality of the mobile phone.

Implementations may include some or all of the following features. The method may further include: determining that the vehicle has stopped moving; and in response to the determination, enabling the at least some functionality of the mobile phone. The method may further include: determining that the mobile phone has moved within the vehicle; and in response to the determining that the mobile phone has moved within the vehicle: playing the sound in the vehicle; recording the sound played in the vehicle; based on the recorded sound and the sound model, determining if the mobile phone is in the driver seat of the vehicle; and if it is determined that the mobile phone is in the driver seat of the vehicle, disabling the at least some functionality of the mobile phone. The method may further include: determining a vehicle type of the vehicle; and selecting the sound model from a plurality of sound models based on the determined vehicle type. Each sound model of the plurality of sound models may be trained using a different vehicle type of a plurality of vehicle types. The sound may be played from a vehicle speaker. The sound may be played from a speaker of the mobile phone. The sound may be recorded from a microphone associated with the mobile phone. The sound may be a sine sweep.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
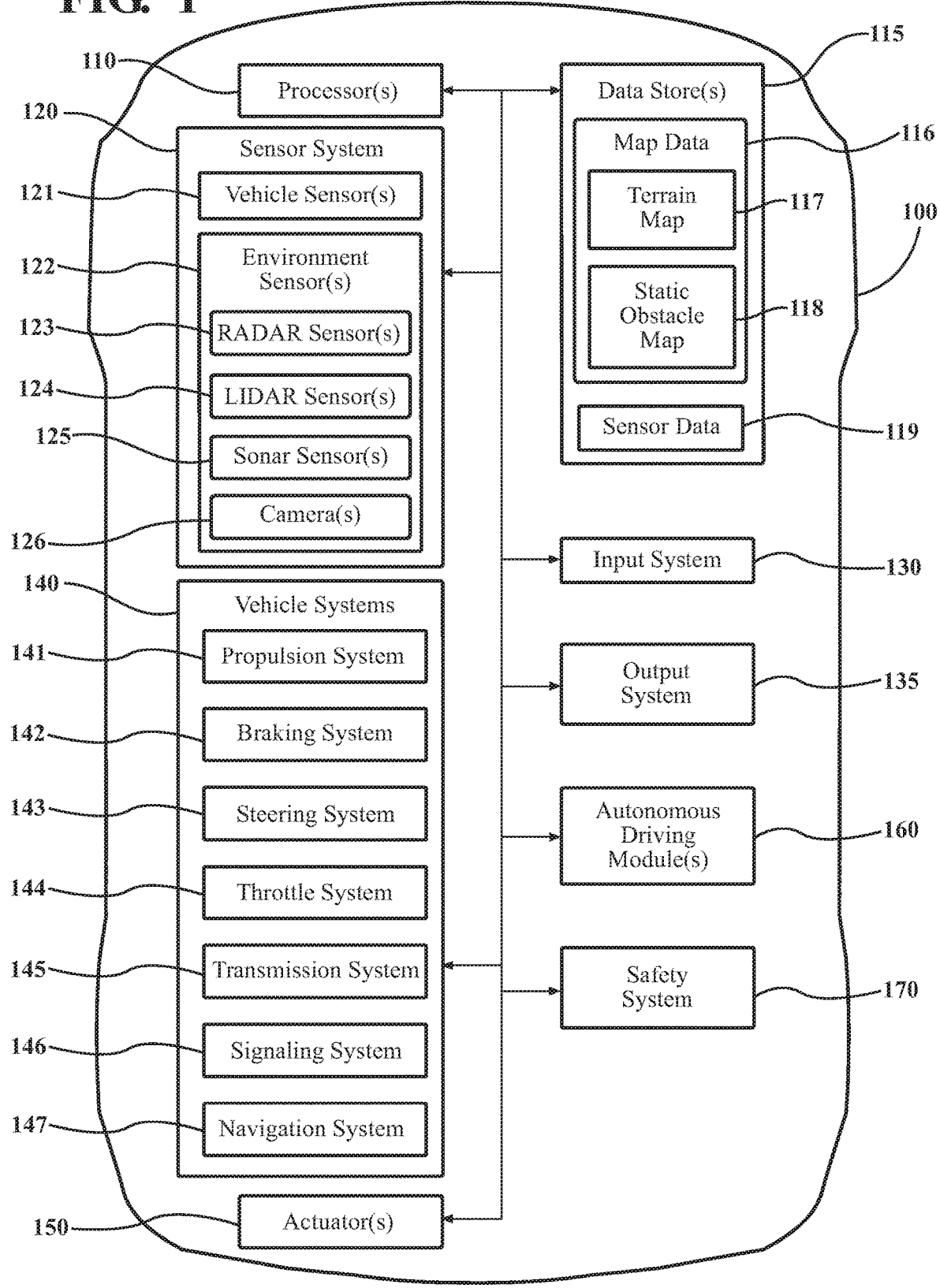
FIG. 1 illustrates one embodiment of a vehicle within which systems and methods disclosed herein may be implemented.

With regards to FIG. 1, a vehicle 100 includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. The vehicle 100 may be a non-autonomous, semi-autonomous, or fully autonomous vehicle. Any type of vehicle 100 may be supported.

Some of the possible elements of the vehicle 100 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes the safety system 170 that is implemented to disable mobile phone usage in the driver seat of the vehicle. The noted functions and methods will become more apparent with a further discussion of the figures.

Figure 2:
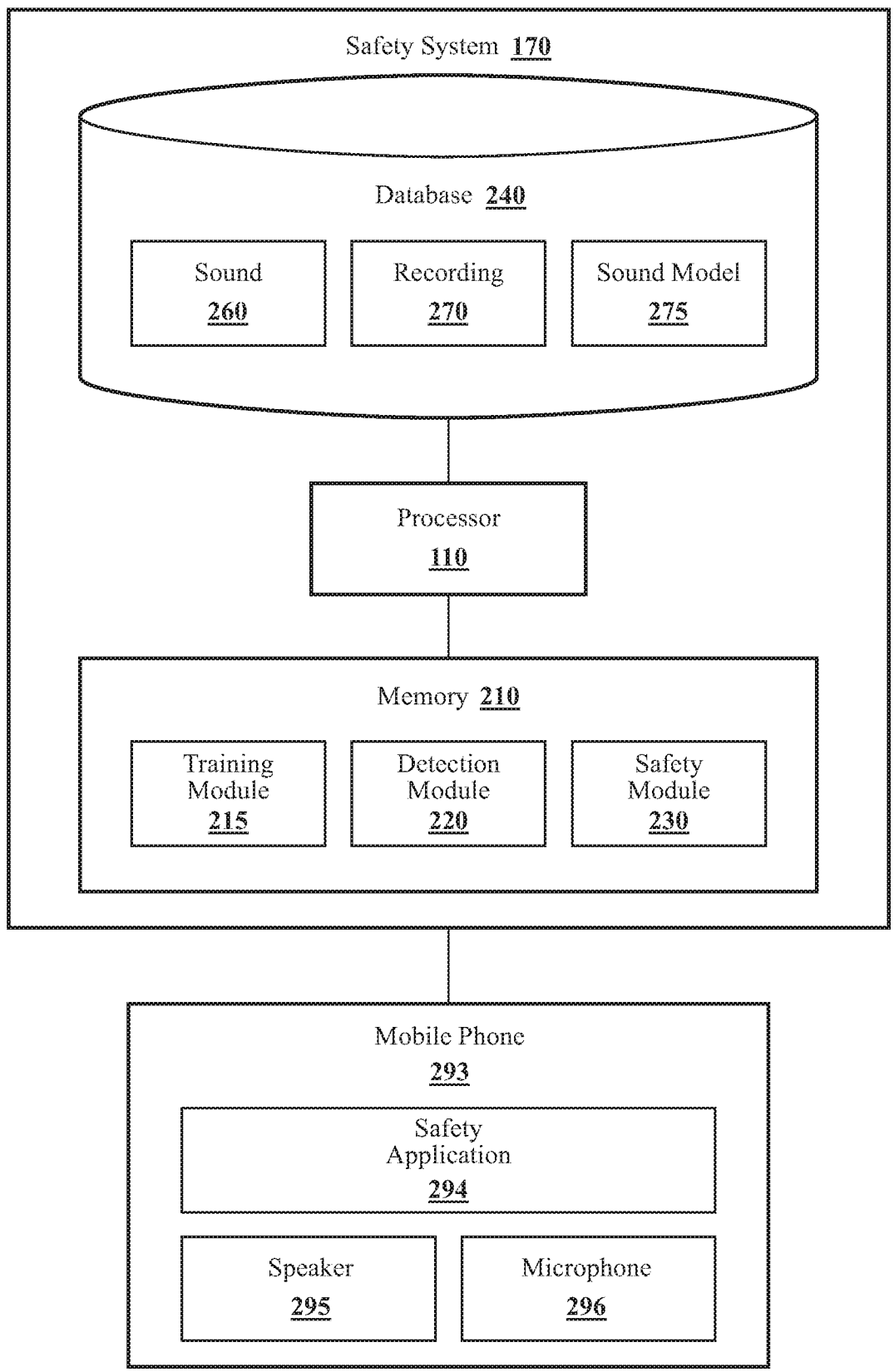
FIG. 2 illustrates one embodiment of a safety system.

With reference to FIG. 2, one embodiment of the safety system 170 of FIG. 1 is further illustrated. The safety system 170 is shown as including a processor 110 from the vehicle 100 of FIG. 1. Accordingly, the process or 110 may be a part of the safety system 170, the safety system 170 may include a separate processor from the processor 110 of the vehicle 100, or the safety system 170 may access the processor 110 through a data bus or another communication path. It should be appreciated, that while the safety system 170 is illustrated as being a single contained system, in various embodiments, the safety system 170 is a distributed system that is comprised of components that can be provided as a centralized server, a cloud-based service, and so on.

In one embodiment, the safety system 170 includes a memory 210 that stores a training module 215, a detection module 220, and a safety module 230. The memory 210 is a random-access memory (RAM), read-only memory (ROM), a hard-disk drive, a flash memory, or other suitable memory for storing the modules 215, 220, and 230. The modules 215, 220, and 230 are, for example, computer-readable instructions that when executed by the processor 110 cause the processor 110 to perform the various functions disclosed herein. Moreover, as previously noted, in various embodiments, one or more aspects of the safety system 170 are implemented as cloud-based services, and so on. Thus, one or more modules of the safety system 170 may be located remotely from other components and may be implemented in a distributed manner.

Furthermore, in one embodiment, the safety system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 215, 220, and 230 in executing various functions. In one embodiment, the database 240 includes a sound model 275 along with, for example, other information that is used and/or generated by the modules 215, 220, and 230 such as a sound 260 and a recording 270. Of course, in further embodiments, the various information may be stored within the memory 210 or another suitable location.

The safety system 170 is able to communicate with a mobile phone 293. The mobile phone 293 may include smart phones, cell phones, personal digital assistants, video game consoles, and any other type of computing device. The safety system 170 may communicate with the mobile phone 293 using a variety of wireless and wired communication means including, but not limited to, cellular, WI-FI, Bluetooth, USB, etc. As shown the mobile phone 293 includes a safety application 294, a speaker 295, and a microphone 296.

Note that the following disclosure will describe functions and processes being performed by the particular modules 215, 220, and 230 of the services system 170, as well as the safety application 294 of the mobile phone 293. However, this is for illustrative purposes only, any functions performed by the modules 215, 220, and 230 may also be performed by the safety application 294, and vice versa. Moreover, while the mobile phone 293 is shown as being separate from the safety system 170, in some embodiments the mobile phone 293 is part of the safety system 170 or the safety system 170 may be implemented completely or partially by the mobile phone 293.

The training module 215 is configured to generate a sound model 275 for different types of vehicles 100. A sound model 275 may be a model that receives as an input a recording 270 taken by a mobile phone 293, and based on information in the recording 270, outputs a prediction of the seat (e.g., passenger, driver, or rear) of the vehicle 100 that the mobile phone 293 was likely in when the recording 270 was made. The sound model 275 may further output a confidence value associated with the prediction. In some embodiments, the sound model 275, rather than predict the seat, may output a probability that the mobile phone 293 was in the driver seat when the recording 270 was made. As may be appreciated, to prevent distracted driving, it is only necessary to know whether or not the mobile phone 293 is in the driver seat. However, for other applications knowing the actual seat may be desirable.

As described above, the training module 215 may generate a sound model 275 for different types of vehicles 100. As used herein the definition of type may be dependent on the embodiment. In one embodiment, the term type may refer to a particular vehicle make, model, and year. In another embodiment, the term type may more broadly correspond to categories of vehicles such as coupes, sedans, SUVs, compact cars, etc. Other definitions of vehicle type may be supported.

The training module 215 may generate a sound model 275 for a vehicle type, by first generating training data. To generate the training data, the training module 215 may, for each seat location in the vehicle 100, place the mobile phone 293 at the seat location and cause the mobile phone 293 to play a sound 260. While the mobile phone 293 is playing the sound 260, the training module 215 may further cause the mobile phone 293 to generate a recording 270 from the seat location. The recording 270 and the associated seat location are referred to herein as a data sample and stored as part of the training data.

The training module 215 may generate a plurality of data samples for each seat location in the vehicle 100. Depending on the embodiment, the training module 215 may further vary the positioning and orientation of the mobile phone 293 in each seat location to try to capture the different ways that users may hold or place their mobile phone 293 while sitting in the vehicle 100.

As may be appreciated, the various recordings 270 of the sound 260 taken from the different seat locations, orientations, and positions are meant to capture the different acoustical characteristics of the different seat locations in the vehicle 100. Each different seat location may have different acoustical characteristics due to differences in overall size, materials, and objects that all absorb or reflect particular frequencies of sound in different ways. This may lead to different patterns of constructive and destructive interferences of sound waves that can be observed or identified in the recordings 270 for each seat location. These differences in constructive and destructive interference are known as room modes.

For example, a driver seat typically is associated with a smooth glass windshield, dashboard, and objects such as a steering wheel and other vehicle controls. The front passenger seat has the dashboard and windshield, but lacks the vehicle controls. Accordingly, when the sound 260 is played in the front passenger seat different room modes may be observed in the recording 270 than when the sound 260 was played in the driver seat. Similar differences in room modes may be observed between the rear vehicle seats and the driver seat due to at least the lack of the dashboard and windshield in the rear seats.

The training module 215 may use the data samples generated for each of the seat locations in the vehicle 100 to train the sound model 275 for the type of the vehicle 100. The sound model 275 may be trained to receive a recording 270 of the sound 260, and to predict the seat location of a mobile phone 293 in the vehicle 100 of same type as the sound model 275. In some embodiments, the sound model 275 may predict the seat location by comparing the room modes of the recording 270 with the room modes learned for each seat location while training the sound model 275. The sound model 275 may predict the specific seat location for a recording 270, or may predict whether or not the seat location is the driver seat of the vehicle 100.

The training module 215 may train and store sound models 275 as described above for each of a plurality of vehicle types and may store the sound models 275 in the database 240. Alternatively or additionally, the safety system 170 of a vehicle 100 may download or receive a sound model 275 corresponding to its vehicle type. Updates to the sound model 275 may be periodically pushed to the vehicle 100.

The detection module 220 may be configured to detect when a mobile phone 293 has entered the vehicle 100. Depending on the embodiment, the detection module 220 may detect that a mobile phone 293 is in the vehicle 100 by detecting one or more wireless signals emitted by the mobile phone 293 such as cellular, Bluetooth, or WI-FI signals. Other signals may be detected. In other embodiments, when a mobile phone 293 enters the vehicle 100 it may automatically try to connect with the vehicle 100 to interface with systems of the vehicle 100 such as an audio system or a navigation system. The detection module 220 may then detect that the mobile phone 293 has entered the vehicle 100 through its connection with one or more of the systems. Other methods for detecting a vehicle 100 may be used.

The safety module 230 is configured to determine whether or not the mobile phone 293 is currently located in the driver seat of the vehicle 100. Depending on the embodiment, the safety module 230 may be configured to make the determination in response to the detection module 220 detecting that the mobile phone 293 is in the vehicle 100 and some other action such as the vehicle 100 being started or the vehicle 100 being in motion. Whether or not the vehicle 100 has been started or in in motion may be determined by the safety module 230 interfacing with one or more vehicle systems 140 such as the propulsion system 141 or the throttle system 144. Other vehicle systems 140 may be used.

The safety module 230 may interact with the mobile phone 293 through a safety application 294 installed on the mobile phone 293. The safety application 294 may be an application that is downloaded to the mobile phone 293 from an application store, or alternatively directly from the safety system 170 of the vehicle 100. Depending on the embodiment, when the mobile phone 293 is detected in the vehicle 100, the safety module 230 may check to see if the safety application 294 has been downloaded to the mobile phone 293, and if not, the safety module 230 may send the mobile phone 293 a link to where the safety application 294 can be downloaded. The vehicle 100 may be disabled and prevented from being driven until the safety module 230 has determined that the safety application 294 has been downloaded onto the mobile phone 293.

The safety module 230 may be configured to determine if the mobile phone 293 is located in the driver seat by first causing the safety application 294 to begin playing the sound 260 through the speaker 295 of the mobile phone 293. The sound 260 may be a sine sweep and may be sequence of increasing or decreasing sound frequencies. The sine sweep may be from 1 khz-8 khz. Other frequencies may be used.

The sound 260 may include audible frequencies, inaudible frequencies, or some combination of both. The sound 260 may be the same sound 260 that was used to train the sound model 275. In some embodiments, the sound 260 may be played though a speaker associated an audio system of the vehicle 100 instead of the speaker 295.

The safety module 230 may be further configured to cause the safety application 294 to record sound within the interior of the vehicle 100 while the sound 260 is played. The sound may be recorded by the microphone 296 and stored by the safety application 294 as the recording 270.

The safety module 230 may be further configured to use the sound model 275 corresponding to the type of the vehicle 100 to determine if the mobile phone 293 is located in the driver seat. The sound model 275 may compare the room modes, or other frequency information, with the room modes or frequencies found to be associated with the driver seat. Depending on the embodiment, the sound model 275 may either indicate whether or not the mobile phone 293 is associated with the driver seat, or may specifically indicate the seat that the mobile phone 293 is located in.

In some implementations, the safety application 294 may process the recording 270 at the mobile phone 293 using the sound model 275. In other implementations, the safety application 294 may send the recording 270 to the safety module 230 and the safety module 230 may process the recording 270 using the sound model 275 at the vehicle 100 or at a cloud-based environment.

If the safety module 230, or safety application 294, determines that the mobile phone 293 is not located in the driver seat, or is located in a seat other than the driver seat, the safety module 230 may take no further action and may allow the mobile phone 293 to be used while the vehicle 100 is moving.

If the safety module 230, or safety application 294, determines that the mobile phone 293 is located in the driver seat, then the safety application 294 may cause functionality of the mobile phone 293 to be disabled. For example, the safety application 294 may disable texting, email, notifications, or any other functionality of the mobile phone 293 that may be distracting to the driver of the vehicle 100. Depending on the embodiment, the safety application 294 may re-enable the disabled functionality upon detecting that the vehicle 100 has stopped.

The detection module 220 may be configured to detect when the mobile phone 293 has moved within the vehicle 100, and to cause the safety module 230 to re-determine the location of the mobile phone 293 in the vehicle 100 when the detection module 220 determines that the mobile phone 293 has moved. For example, the safety application 294 may provide the detection module 220 with information from an accelerometer or other sensor associated with the mobile phone 293 and the detection module 220 may determine that the mobile phone 293 has moved based on the information. In some implementations, the detection module 220 may compare the information from the accelerometer with known movements of the vehicle 100 so that movement of the mobile phone 293 that are attributable to the movements of the vehicle 100 can be accounted for. Any method for determining that a mobile phone 293 has moved can be used.

Figure 3:
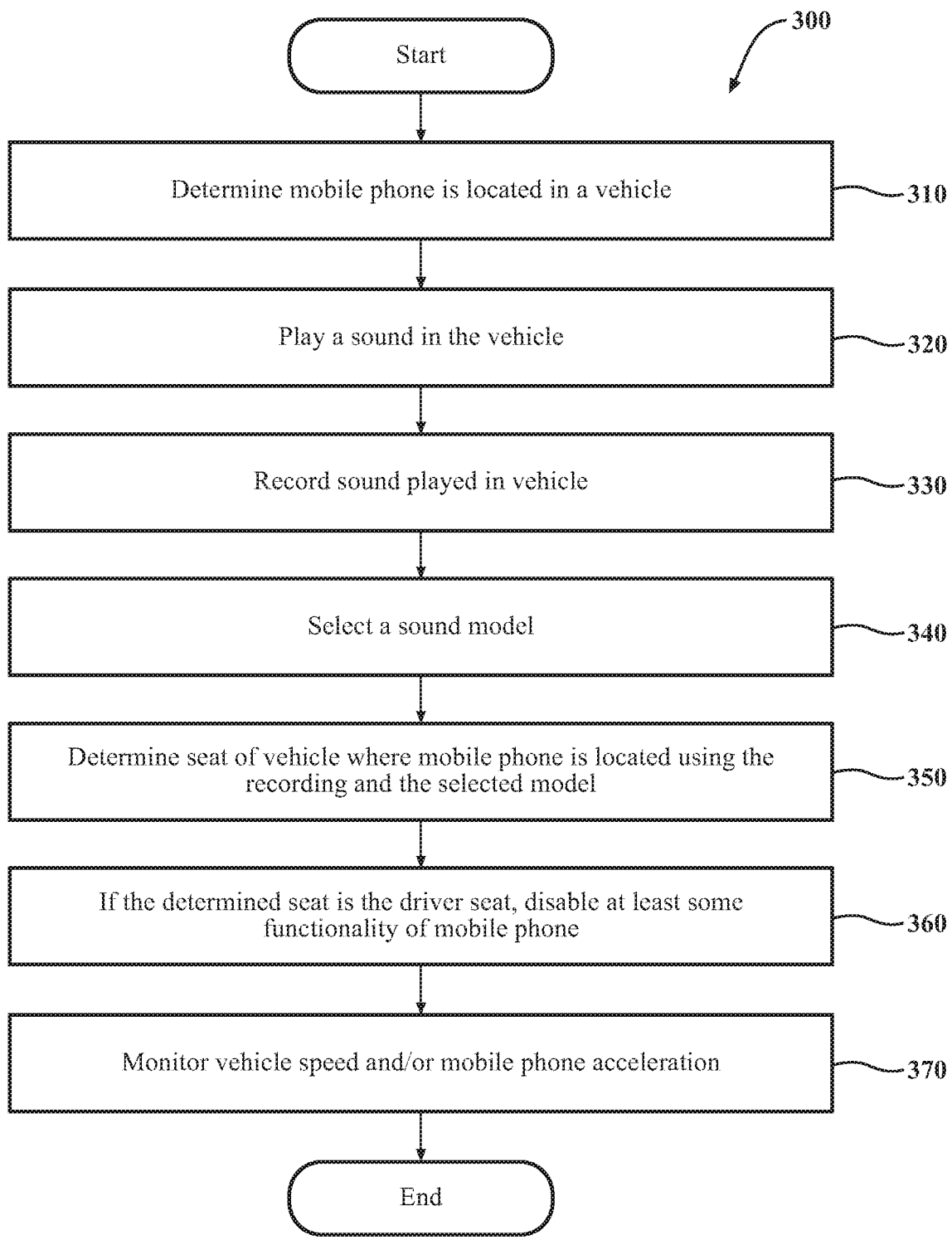
FIG. 3 illustrates a flowchart of a method that is associated with locating a mobile phone in a vehicle using a sound model.

Additional aspects of vehicle safety will be discussed in relation to FIG. 3. FIG. 3 illustrates a flowchart of a method 300 that is associated with disabling functionality of a mobile phone 293 based on the location of the mobile phone 293 in a vehicle 100. The method 300 will be discussed from the perspective of the safety system 170 of FIGS. 1 and 2. While the method 300 is discussed in combination with the safety system 170, it should be appreciated that the method 300 is not limited to being implemented within the safety system 170 but is instead one example of a system that may implement the method 300.

At 310, the detection module 220 determines that a mobile phone 293 is located in a vehicle 100. The detection module 220 may make the determination based on wireless signals associated with the mobile phone 293, for example. Other methods for detecting a mobile phone 293 may be used. The mobile phone 293 may have a safety application 294 installed that allows the mobile phone 293 to interface with the safety system 170.

At 320, the safety module 230 causes a sound 260 to be played in the vehicle 100. The sound 260 may be a sine sweep. The safety module 230 may cause the safety application 294 to play the sound 260 through a speaker 295 of the mobile phone 293. Alternatively, the safety module 230 may cause an audio system or speaker of the vehicle 100 to play the sound 260.

At 330, the safety module 230 causes sound played in the vehicle 100 to be recorded. The safety module 230 may cause the safety application 294 to record the sound played in the vehicle 100 using a microphone 296 associated with the mobile phone 293. The safety application 294 may record the sound as the recording 270, and may provide the recording 270 to the safety module 230. Alternatively, the safety module 230 may generate the recording 270 using a microphone associated with the vehicle 100. In some embodiments, the safety module 230 may begin recording as soon as the sound 260 is played in the vehicle 100. According, the steps 320 and 330 may be performed at approximately the same time.

At 340, the safety module 230 selects a sound model 275. The safety module 230 may select a sound model 275 that corresponds to a type of the vehicle 100. The type may correspond to a make, model, and year associated with the vehicle 100.

At 350, the safety module 230 determines a seat of the vehicle 100 where the mobile phone 293 is located based on the recording and the selected sound model 275. Depending on the embodiment, the safety module 230 may either determine the seat of the vehicle where the mobile phone 293 is located, or may just determine whether or not the mobile phone 293 is located in the driver seat.

At 360, the safety module 230 disables at least some functionality of the mobile phone 293 if the determined seat is the driver seat. Depending on the embodiment, the safety module 230 may instruct the safety application 294 to disable functionality of the mobile phone 293 that may lead to distracted driving such as texting, notifications, games, and calling. Other functionality may be disabled. Any method or technique for disabling functionality of a mobile phone 293 may be used.

At 370, the detection module 220 monitors the speed of the vehicle 100 and acceleration of the mobile phone 293. The detection module 220 may monitor the speed of the vehicle 100 to determine when the disabled functionality of the mobile phone 293 can be enabled. For example, the detection module 220 may determine when the vehicle 100 has stopped, and may enable all functionality of the mobile phone 293 while the vehicle 100 remains stopped.

The detection module 220 may monitor the acceleration of the mobile phone 293 to determine when the mobile phone 293 may have moved seats in the vehicle 100. If it is determined that the mobile phone 293 may have moved seats, then the safety module 230 may re-determine the seat that the mobile phone 293 is located in as described above in steps 320-360.

Figure 4:
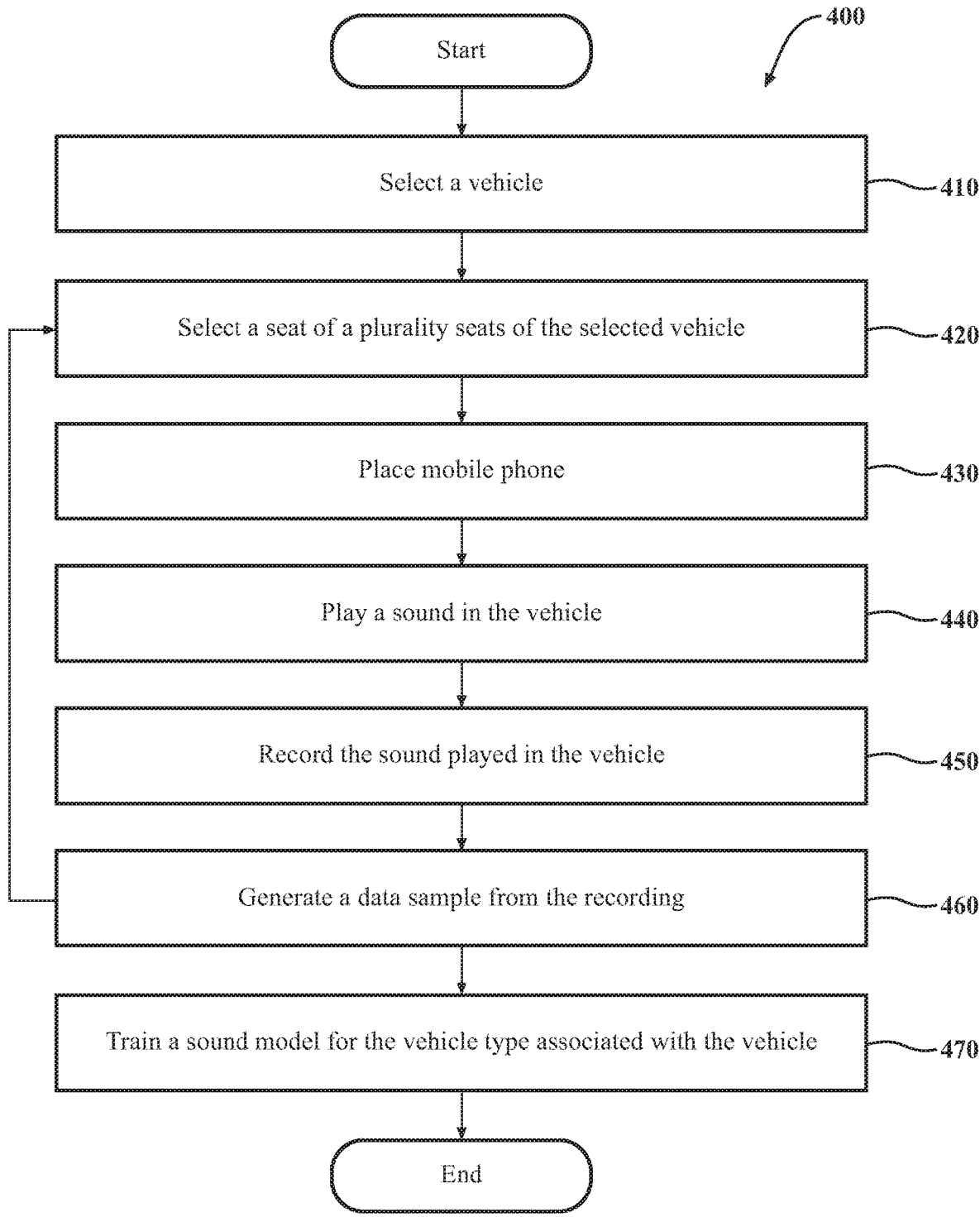
FIG. 4 illustrates a flowchart of a method that is associated with training a sound model to locate a mobile phone is a vehicle.

Additional aspects of vehicle safety will be discussed in relation to FIG. 4. FIG. 4 illustrates a flowchart of a method 400 that is associated with training a sound model 275 to locate a mobile phone 293 in a vehicle 100 based on a recording 270. The method 400 will be discussed from the perspective of the safety system 170 of FIGS. 1 and 2. While the method 400 is discussed in combination with the safety system 170, it should be appreciated that the method 400 is not limited to being implemented within the safety system 170 but is instead one example of a system that may implement the method 400.

At 410, the training module 215 selects a vehicle 100. The selected vehicle 100 may be of a type that the training module 215 is interested in training a sound model 275 for. The type may be selected by a user or administrator or by the training module 215 from a list of vehicle types, for example.

At 420, the training module 215 selects a seat of a plurality of seats of the selected vehicle 100. The seat may be randomly selected or may be a next seat in the vehicle 100 to be used to generate a sample for the training data that will be used to train the sound model 275 for the selected vehicle 100.

At 430, the training module 215 places a mobile phone 293 in the selected seat. The mobile phone 293 may be placed in the selected seat by a user or administrator, or other entity, under the control of the training module 215. In some implementations, the mobile phone 293 may be placed in the same approximate seat location (e.g., in the middle) with the same approximate orientation (e.g., facing upward). In other implementations, the seat locations and orientations may be randomly or rotated among a plurality of seat locations and orientations. The mobile phone 293 may include a safety application 294 that allow the training module 215 to control the operation of the mobile phone 293.

At 440, the training module 215 causes the mobile phone 293 to play a sound 260 in the vehicle 100. The sound 260 may be a sine sweep. The training module 215 may cause the safety application 294 to play the sound 260 through a speaker 295 of the mobile phone 293. Alternatively, the training module 215 may cause an audio system or speaker of the vehicle 100 to play the sound 260.

At 450, the training module 215 records sound played in the vehicle 100. The training module 215 may cause the safety application 294 to record the sound played in the vehicle 100 using a microphone 296 associated with the mobile phone 293. The safety application 294 may record the sound as the recording 270, and may provide the recording 270 to the training module 230.

At 460, the training module 215 generates a data sample from the recording 270. The training module 215 may generate a data sample by determining room modes or resonate frequencies associated with the recording 270. These room modes may then be associated with the selected seat, and stored by the training module 215 as the data sample.

The method 400 may return to 420 where a different seat of the vehicle 100 is selected to generate a data sample from.

The method 400 may continue to generate data samples for different seats (and positions and orientations) until a desired number of data samples have been generated for the training data.

At 470, the training module 215 trains a sound model 275 for the type of the selected vehicle 100. Any method for training a sound model 275 may be used. The sound model 275 may be trained to identify which seat in the vehicle 100 of the associated type a mobile phone is located 293 based on room modes or resonate frequencies found in a recording 270 of the sound 260 played by the mobile phone 293. Alternatively, the sound model 275 may be trained to identify whether or not the mobile phone 293 is located in the driver seat of the vehicle 100.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the safety system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the safety system 170, and/or the autonomous driving module(s) 160 may control some or all of these vehicle systems 140 and, thus, may be partially or fully autonomous.

The processor(s) 110, the safety system 170, and/or the autonomous driving module(s) 160 can be operatively connected to communicate with the various vehicle systems 140 and/or individual components thereof. For example, returning to FIG. 1, the processor(s) 110, the safety system 170, and/or the autonomous driving module(s) 160 can be in communication to send and/or receive information from the various vehicle systems 140 to control the movement, speed, maneuvering, heading, direction, etc. of the vehicle 100. The processor(s) 110, the safety system 170, and/or the autonomous driving module(s) 160 may control some or all of these vehicle systems 140.

The processor(s) 110, the safety system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the safety system 170, and/or the autonomous driving module(s) 160 can control the direction and/or speed of the vehicle 100. The processor(s) 110, the safety system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the safety system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for locating a mobile phone in a vehicle comprising:
   one or more processors;
   a memory communicably coupled to the one or more processors and storing:
      a detection module including instructions that when executed by the one or more processors cause the one or more processors to:
      determine that a mobile phone is located in a vehicle; and
   a safety module including instructions that when executed by the one or more processors cause the one or more processors to:
      in response to the determination, play a sound in the vehicle;
      record the sound played in the vehicle;
      based on the recorded sound and a sound model, determine if the mobile phone is in a driver seat of the vehicle; and
      if it is determined that the mobile phone is in the driver seat of the vehicle, disable at least some functionality of the mobile phone.

2. The system of claim 1, wherein the safety module further includes instructions that when executed by the one or more processors cause the one or more processors to:
   determine that the vehicle has stopped moving; and
   in response to the determination, enable the at least some functionality of the mobile phone.

3. The system of claim 1, wherein the safety module further includes instructions that when executed by the one or more processors cause the one or more processors to:
   determine that the mobile phone has moved within the vehicle; and
   in response to determining that the mobile phone has moved within the vehicle:
      play the sound in the vehicle;
      record the sound played in the vehicle;
      based on the recorded sound and the sound model, determine if the mobile phone is in the driver seat of the vehicle; and
      if it is determined that the mobile phone is in the driver seat of the vehicle, disable the at least some functionality of the mobile phone.

4. The system of claim 1, wherein the safety module further includes instructions that when executed by the one or more processors cause the one or more processors to:
   determine a vehicle type of the vehicle; and
   select the sound model from a plurality of sound models based on the determined vehicle type.

5. The system of claim 4, wherein each sound model of the plurality of sound models is trained using a different vehicle type of a plurality of vehicle types.

6. The system of claim 1, wherein the sound is played from a vehicle speaker.

7. The system of claim 1, wherein the sound is played from a speaker of the mobile phone.

8. The system of claim 1, wherein the sound is a sine sweep.

9. A method for locating a mobile phone in a vehicle comprising:
   determining that a mobile phone is located in a vehicle;
   in response to the determination, playing a sound in the vehicle;
   recording the sound played in the vehicle;
   based on the recorded sound and a sound model, determining if the mobile phone is in a driver seat of the vehicle; and
   if it is determined that the mobile phone is in the driver seat of the vehicle, disabling at least some functionality of the mobile phone.

10. The method of claim 9, further comprising:
    determining that the vehicle has stopped moving; and
    in response to the determination, enabling the at least some functionality of the mobile phone.

11. The method of claim 9, further comprising:
    determining that the mobile phone has moved within the vehicle; and
    in response to the determining that the mobile phone has moved within the vehicle:
       playing the sound in the vehicle;
       recording the sound played in the vehicle;
       based on the recorded sound and the sound model, determining if the mobile phone is in the driver seat of the vehicle; and
       if it is determined that the mobile phone is in the driver seat of the vehicle, disabling the at least some functionality of the mobile phone.

12. The method of claim 9, further comprising:
    determining a vehicle type of the vehicle; and
    selecting the sound model from a plurality of sound models based on the determined vehicle type.

13. The method of claim 12, wherein each sound model of the plurality of sound models is trained using a different vehicle type of a plurality of vehicle types.

14. The method of claim 9, wherein the sound is played from a vehicle speaker.

15. The method of claim 9, wherein the sound is played from a speaker of the mobile phone.

16. The method of claim 9, wherein the sound is recorded from a microphone associated with the mobile phone.

17. The method of claim 9, wherein the sound is a sine sweep.

18. A method of training a sound model for a vehicle comprising:
    selecting a first vehicle, wherein the first vehicle is associated with a vehicle type of a plurality of vehicle types;
    generating training data comprising a plurality of data samples, wherein generating each data sample comprises:
       selecting a seat of a plurality of vehicle seats of the first vehicle;
       placing a first mobile phone in the selected seat;
       playing a sound in the first vehicle by the first mobile phone;
       recording the sound played in the first vehicle by the first mobile phone; and
       generating the data sample from the recorded sound, wherein the data sample is associated with the selected seat; and
    training a sound model for the vehicle type associated with the first vehicle using the training data.

* * * * *